United States Patent

Grupp

Patent Number: 5,163,057
Date of Patent: Nov. 10, 1992

[54] METHOD OF AND CIRCUIT ARRANGEMENT FOR DETERMINING A CELL LOSS AND/OR A CELL INSERTION DURING TRAVERSAL OF A CELL ORIENTED TRANSMISSION DEVICE BY CELL STRUCTURED SIGNALS

[75] Inventor: Wolfgang Grupp, Eningen, Fed. Rep. of Germany

[73] Assignee: Wandel & Goltermann GmbH & Co., Eningen, Fed. Rep. of Germany

[21] Appl. No.: 510,206

[22] Filed: Apr. 17, 1990

[30] Foreign Application Priority Data

Apr. 18, 1989 [DE] Fed. Rep. of Germany ........ 3912660

[51] Int. Cl.$^5$ ............................................... H04J 3/14
[52] U.S. Cl. ..................................... 371/47.1; 370/13; 371/20.4
[58] Field of Search ..................... 371/20.1, 20.2, 20.4, 371/27; 370/105.1, 107, 13

[56] References Cited

U.S. PATENT DOCUMENTS 5,099,480 3/1992 Murata ............................... 371/20.4

FOREIGN PATENT DOCUMENTS 2359716 7/1979 Fed. Rep. of Germany .
3342638 6/1985 Fed. Rep. of Germany .

OTHER PUBLICATIONS

ATM-Ein Übermittlungskonzept nicht nur für Breitbanddienste PKI Tech. MITT Feb. 1989.
ATM-Ein Universelles Übermittlungsverfahren, ein Papier der Deutschen Bundespost (FTZ).

Primary Examiner—Stephen M. Baker
Attorney, Agent, or Firm—Herbert Dubno

[57] ABSTRACT

A method of and a circuit for detecting a cell loss and/or a cell insertion in cell structured signals traversing a cell oriented transmission module. A bit comparison is effected between a test signal sequence formed as a cell header and an information signal sequence filling the remainder of the cell and the bit comparison can detect the leading or lagging by a bit. When this bit comparison is, in addition, continuous; a cell loss or cell insertion is determined.

12 Claims, 3 Drawing Sheets

FIG. 2

| | A | B | C | D | E | F | |
|---|---|---|---|---|---|---|---|
|..| 12345671 | 23456724 | 34567123 | 45671234 | 56712345 | 67123456 |...|

RECEIVED PATTERN

| | a | b | c | d | e | f | |
|---|---|---|---|---|---|---|---|
|..| 12345671 | 23456712 | 34567123 | 45671234 | 56712345 | 67123456 |...|

REFERENCE PATTERN

FIG. 3

CELL LOSS

| | A | C | D | E | F | |
|---|---|---|---|---|---|---|
|..| 12345671 | 34567123 | 45671234 | 56712345 | 67123456 |...|

RECEIVED SAMPLE

| | a | b | c | d | e | f | |
|---|---|---|---|---|---|---|---|
|..| 12345671 | 23456712 | 34567123 | 45671234 | 56712345 | 67123456 |...|

REFERENCE PATTERN

FIG. 4

CELL INSERTION

| | A | X | B | C | D | E | |
|---|---|---|---|---|---|---|---|
|..| 12345671 | xxxxxxxx | 23456712 | 34567123 | 45671234 | 56712345 |...|

RECEIVED PATTERN

| | a | b | c | e | f | g | |
|---|---|---|---|---|---|---|---|
|..| 12345671 | 23456712 | 34567123 | 45671234 | 56712345 | 67123456 |...|

REFERENCE PATTERN

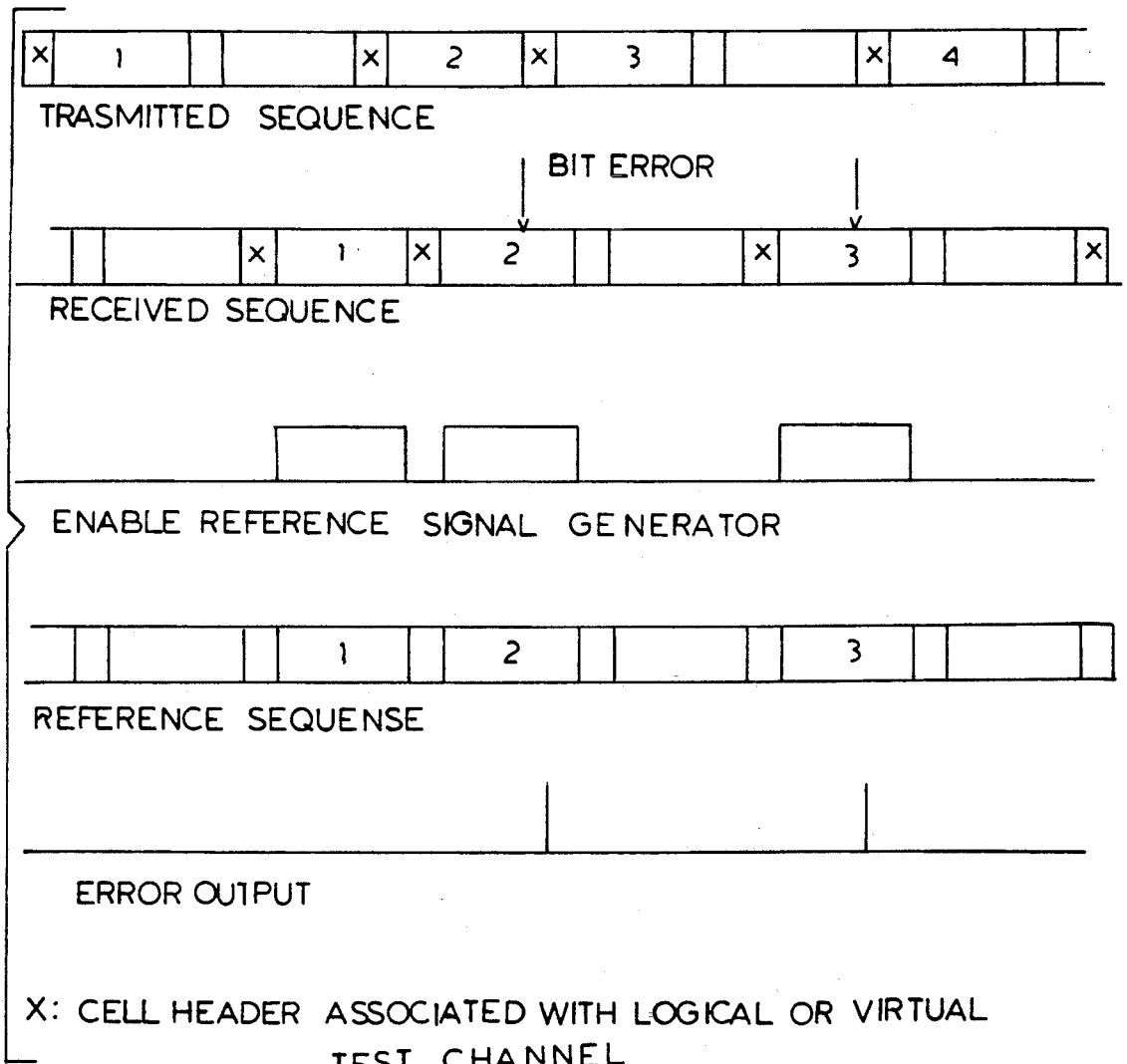

METHOD OF AND CIRCUIT ARRANGEMENT FOR DETERMINING A CELL LOSS AND/OR A CELL INSERTION DURING TRAVERSAL OF A CELL ORIENTED TRANSMISSION DEVICE BY CELL STRUCTURED SIGNALS

FIELD OF THE INVENTION

My present invention relates to a method of and to a circuit arrangement for determining a cell loss and/or cell insertion during the traversal of a cell oriented transmission device by cell structured signals in information handling networks or the like.

In broad band Integrated Service Digital Networks (ISDN's), for example, but also in other communication systems having cell oriented transmission devices or units, the traversal of a cell structured signal through the unit may result, in addition to other errors, in cell losses and cell insertions which can be treated as transmission faults or errors as well.

To determine a cell loss and/or a cell insertion, it is known to include in the information fields of sequential cells, sequential distinctive integers or numbers, classification integers or numbers or the like and to determine at the receiver side the sequence of such numbers to ascertain the presence of gaps in the sequence or an overlap in the sequence.

OBJECT OF THE INVENTION

It is the principal object of the present invention to provide a simplified method and circuit for the detection of a cell loss and/or a cell insertion in transmission units operating with cell structured signals.

Another object of the invention is to provide a method of and a circuit for determining, in a transmission system of a broad band ISDN, for example, cell losses and/or cell insertions in the cell structured information flow transmitted through a cell oriented transmission unit of such a system.

SUMMARY OF THE INVENTION

These objects and others which will become apparent hereinafter are attained, in accordance with the present invention in a method of determining or detecting a cell loss and/or a cell insertion during the passage of cell structured signals through a cell oriented transmission unit, the cells of the cell structured signal each comprising a switching information or network information containing header field and the message containing information field and passing through a respective logical channel of the cell oriented transmission unit.

According to the invention, at the transmission side, a cell structured test signal is generated and is transmitted through a logical test channel of the transmission device. The test signal has cells each of which comprises a header field with a first number of bits and an information field with a second number of bits whose lengths are determined by the standard to which the transmission unit corresponds. The header fields of the cells assigned to the logical test channel serve inter alia to indicate or designate the logical test channel of the transmission medium. The information fields of the cells associated with the logical test channel contain a periodic test signal sequence whose periods are smaller by one bit than the second number of bits of the information field.

At the output of the transmission device, the header fields of cells assigned to the logical test channel arriving at this output are recognized. The associated information field is arrayed linearly in a particular bit sequence. A periodic reference signal sequence is generated to correspond to the transmission-side test signal sequence and is started at the end of a recognized cell header and after generating a number of bits corresponding to the second number, is stopped.

The particular bit sequence is compared in a bitwise manner, i.e. bit by bit, with the bit sequence of the reference signals. If, in a first comparison it is determined that one bit sequence leads the other bit sequence by one bit and in a second comparison trails by one bit and upon a continuous agreement of the bit values in one of the bitwise comparisons, the loss of a cell or the insertion of a cell can be detected.

The circuit for carrying out this method comprises a device to distinguish the header field from the information field of the test signals transmitted through the logical channel and thereby separate the information fields from the test signal. This device is connected to a first shift register into which the separated information field is fed. It is also connected to a reference signal generator which generates a periodic reference signal whose period is smaller by one bit than the second number of bits of the information field.

To this reference signal generator and the device for separating the header from the information field is connected a second shift register in which the signal generated by the reference signal generator is stored synchronously with the separated information field.

At least two bit comparators are provided and can each be connected to a respective stage of the first and second shift register and can be poled oppositely in one and the other direction with respect to orientation.

By the bit comparison of signals which are contained in respective shift register stages it is possible to determine whether a cell loss or a cell insertion has occurred.

The cell insertion or cell loss is determined as a consequence of a shift of the received sample relative to the reference sample by evaluating the structure of the error pattern generated by the bitwise comparison.

According to a feature of the invention I can distinguish the bundle errors resulting from failure of the synchronization between transmitter and receiver from bit errors via bit error measuring devices in that between two periods random signal sequences which are generated in the transmitter and receiver of a bit error measuring device respectively provided with a feedback shift register, a bitwise comparison is carried out between the sequence transmitted over the link under test with the receiver side generated pseudorandom sequence and the resulting error signal sequence from the bitwise comparison is evaluated with respect to the difference between a synchronization failure and a bundle error.

This latter method can eliminate bundle errors as well.

The advantage of the system of the invention can be especially found in the fact that transmission systems during their operation can be tested for cell losses and/or cell insertions.

Mention should be made of German Patent 23 59 716 which does disclose a method of distinguishing bundle errors from synchronization failures between transmitter and receiver of a bit-error measuring device, as well as a circuit for carrying out this method. The invention advantageously utilizes the teachings of this reference in addition to the circuitry providing an indication of cell loss or cell insertion as described.

In this system, a bitwise comparison is made between two pseudorandom signal sequences that are generated at the transmitter and receiver in respective feedback shift registers so that the bitwise comparison between the sequence transmitted along the link under test between the transmitter and the receiver is effected with the pseudorandom sequence generated at the receiver side. The error signal sequence which results from this bitwise comparison is evaluated to allow the difference between a synchronization failure and bundle errors to be determined.

German Patent Document DE-OS 33 42 638 discloses a method of monitoring digital fiber optic transmission paths which, however, is only relevant on a physical plane. A monitoring of the connection between the two user segments is therefore not possible. If the format of the data words is altered by the insertion of test bits, an increased transmission speed will result and thus only a bit error can be determined. The determination of cell losses or cell insertions which can arise in the processing of cell structured signals through a cell oriented transmission module or unit is neither taught or suggested.

The invention thus can be considered to provide a method of ascertaining a cell loss and/or a cell insertion in a cell-structured signal, whose cells each are comprised of a header field containing switching information and a message-containing information field, traversing a selected logical channel of a cell-oriented transmission module having a transmission side and an output receiving side, the method comprising the steps of:

(a) generating at the transmission side a cell-structured test signal having respective cells each comprised of a respective header field having a first number of bits and a respective information field having a second number of bits and bit lengths corresponding to a standard of the transmission module, and wherein
  ($a_1$) the header fields of the cells associated with given logical channels of the transmission module include characterizing indicia assigned to the respective logical channels, and
  ($a_2$) the information fields of the cells associated with given logical channels of the transmission module include a periodic test-signal sequence whose periods are smaller by one bit than the second number of bits of the respective information field;

(b) recognizing at the output side the header fields of the cells assigned to the logical test channel arriving at the output side;

(c) arraying the information fields of the cells assigned to the logical test channel recognized at the output side into respective linear bit sequences;

(d) generating at the output side a reference-signal sequence corresponding to the test-signal sequence generated at the transmission side and starting the generation of the reference-signal sequence at the end of recognition of a respective header field of a respective cell and stopping the generation of the reference-signal sequence upon the generation of a number of bits corresponding to the second number; and (e) comparing each of the linear bit sequences bitwise with the reference-signal sequence whereby:
  ($e_1$) in a first comparison one of the compared sequences leads the other compared sequence by one bit and in a second comparison one of the compared sequences lags the other compared sequence by one bit, and
  ($e_2$) a continuous agreement of the bit values obtained by the bitwise comparison confirms the loss or insertion of cells.

Advantageously ascertaining of a cell loss or cell insertion is carried out simultaneously with a distinguishing of bundle errors from a failure of synchronization between the transmission side and the receiving side by a bit-error measuring device and wherein:

two pseudorandom signal sequences are generated in respective feedback shift registers in a transmitter and a receiver of the bit-error measuring device;

a bit-wise comparison is effected between a signal sequence transmitted over a link under test and the pseudorandom signal sequence of the receiver of the bit-error measuring device;

an error-signal sequence is produced by the bit-wise comparison effected between the signal sequence transmitted over the link under test and the pseudorandom signal sequence of the receiver of the bit-error measuring device, and the error-signal sequence is evaluated to indicate selectively and distinguish a synchronization failure and bundle errors.

Further comparisons in which the one of the bit sequences leads or lags the other of the bit sequences by n bits where n is an integer greater than one (n=2, 3, ... ) and a continuous agreement of the bit values obtained by the bitwise comparison confirm a loss or insertion of n cells.

Preferably after detection of a synchronization failure, a new synchronization is automatically started.

The periodic test signal sequence can be a pseudorandom signal generated in a feedback shift register.

A circuit for ascertaining cell loss or cell insertion utilizing these principles comprises (a) means for generating at the transmission side a cell-structured test signal having respective cells each comprised of a respective header field having a first number of bits and a respective information field having a second number of bits and bit lengths corresponding to a standard of the transmission module, and wherein
  ($a_1$) the header fields of the cells associated with given logical channels of the transmission module include characterizing indicia assigned to the respective logical channels, and
  ($a_2$) the information fields of the cells associated with given logic channels of the transmission module include a periodic test-signal sequence whose periods are smaller by one bit than the second number of bits of the respective information field;

(b) means for recognizing at the output side the header fields of the cells assigned to the logical test channel arriving at the output side;

(c) means for arraying the information fields of the cells recognized at the output side into respective linear bit sequences;

(d) means for generating at the output side a reference-signal sequence corresponding to the test-signal sequence generated at the transmission side and starting the generation of the reference-signal sequence at the end of recognition of a respective header field of a respective cell and stopping the generation of the reference-signal sequence upon the generation of a number of bits corresponding to the second number; and (e) means for comparing each of the linear bit sequences bitwise with the reference-signal sequence whereby:

(e₁) in a first comparison one of the compared sequences leads the other compared sequence by one bit and in a second comparison one of the compared sequences lags the other compared sequence by one bit, and (e₂) a continuous agreement of the bit values obtained by the bitwise comparison confirms the loss or insertion of cells.

In this circuit:

the means for recognizing the header fields and the means for arraying the information fields include:

a unit for distinguishing each header field from a respective information field of a cell transmitted along a respective logic channel and separating the respective header field from the respective information field, and a first shift register connected to the unit into which the separated information field is fed;

the means for generating includes:

a reference-signal generator connected to the unit and to the first shift register for generating a reference signal constituting the test-signal sequence and whose period is shorter by one bit than the second number of bits of the information field stored in the shift register, and a second shift register connected to the reference-signal generator and in which the reference signal is stored synchronously with storage of a respective information field in the first shift register; and the means for comparing includes two bit comparators each connected to a stage of the first shift register and the second shift register with the bit comparators being connected to the stages so that they are offset by one stage with respect to one another in a first and a second direction, respectively.

In this circuit, the bit comparators can comprise a first group of bit comparators having first inputs connected with the last stage of the second shift register and second inputs successively connected with stages of the first shift register shifted by one bit from the stage of the second shift register to which the first inputs are connected and each in succession by one bit from another, and a second group of bit comparators each having first inputs connected with the last stage of the first shift register and second inputs successively connected with stages of the second shift register shifted by one bit from the stage of the second shift register to which the first inputs of the second group are connected and each in succession by one bit from another.

The apparatus can further comprise another bit comparator having inputs connected to two parallel stages of the shift register.

BRIEF DESCRIPTION OF THE DRAWING

The above and other objects, features and advantages of my invention will become more readily apparent from the following description, reference being made to the accompanying highly diagrammatic drawing in which:

FIG. 2 is a diagram of two bit sequences to be compared bitwise as these sequences arise in FIG. 1;

FIG. 3 is a diagram similar to that of FIG. 2 showing the effect of loss of a cell;

FIG. 4 is a diagram similar to FIG. 2 showing the effect of the insertion of a cell; and FIG. 5 is a diagram illustrating the relationship between the evaluation and reference signal systems.

SPECIFIC DESCRIPTION

Figure 1:
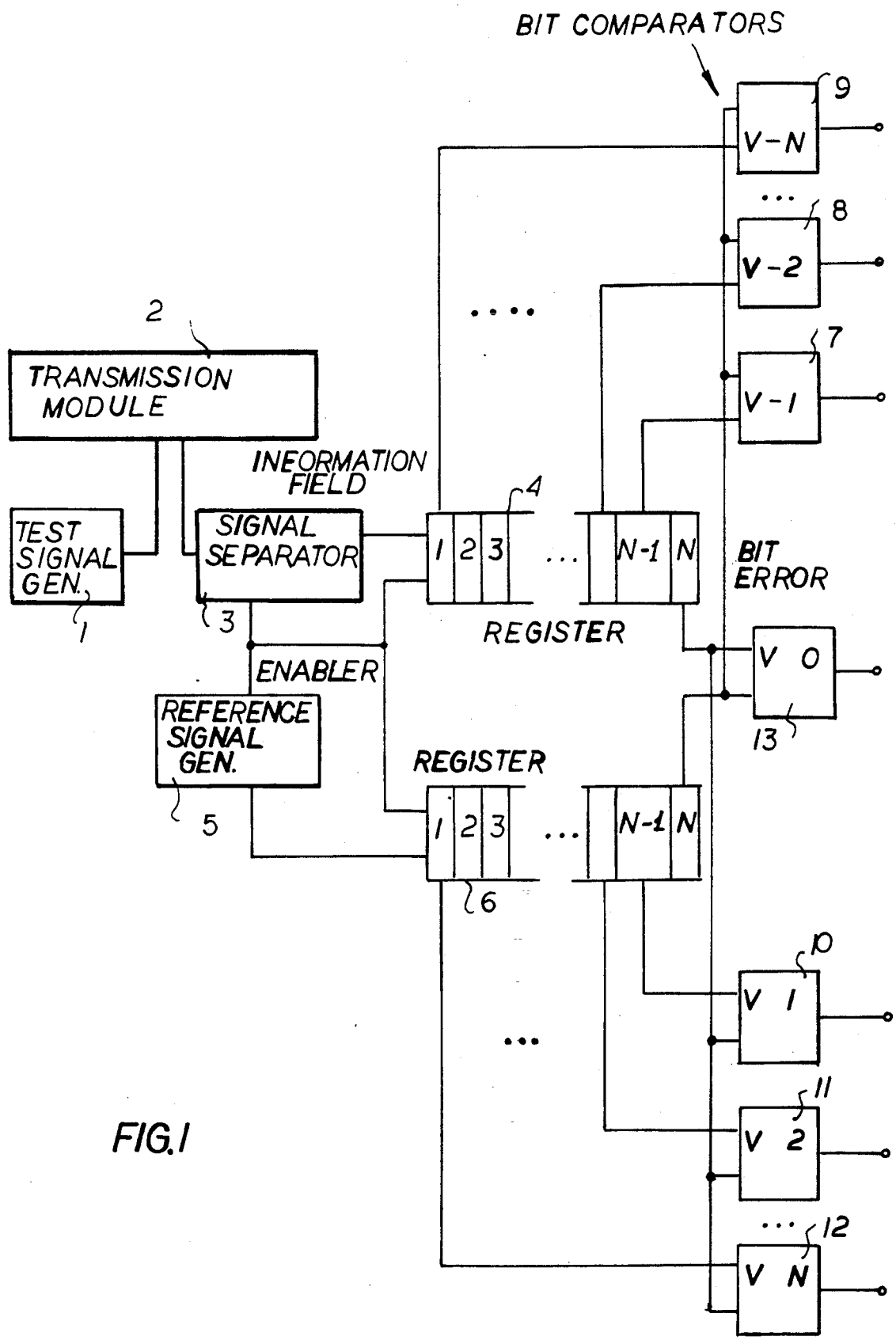
FIG. 1 is a simplified block diagram of a circuit for carrying out the method of the invention.

The circuit illustrated in FIG. 1 comprises a test signal transmitter which generates a cell-structured test signal which is delivered to and presses along a given logic channel, referred to herein as a test channel, of the transmission module or unit 2 and whose cells each comprise a header field with a first number of bits and an information field with a second number of bits such that the bit lengths of the respective fields are determined by the standard with which the transmission module operates. A unit 3 recognizes the cells transmitted through the module 1 at the receiver or output side thereof and separates the header fields from the information fields of such cells. The information field of cells assigned to the test channel is fed to a first shift register 4 in which a corresponding bit sequence is formed.

In a reference signal generator 5, a periodic reference signal sequence corresponding to the test signal sequence at the transmitter side, is generated and is read into a second shift register 6 whose length corresponds to that of the first shift register 4. When a heades of a test cell is recognized the device 3 generates only over the duration of the information field, an enabling signal for the two shift registers 4 and 6 and the reference signal generator 5.

First inputs of a first group of bit comparators 7, 8 and 9 are connected with a last stage of the second shift register 6. First inputs of a second group of bit comparators 10, 11 and 12 are connected with a last stage of the first shift register 4. A further bit comparator 2 is connected between two parallel stages of the two shift registers 4 and 6 and serve for the detection of bit errors which are not caused by cell insertions or cell losses.

The second inputs for the bit comparator 7, 8 and 9 are connected to successive stages of the first shift register 4 which are offset from one another each by one stage and in sequence.

Similarly, the second inputs of the bit comparators 10, 11 and 12 are connected to the sequential stages of the shift register 6 of offset by one stage each.

The diagrams of FIGS. 2 through 4 show in simplified form the detection of cell loss (FIG. 3) and cell insertion (FIG. 4) by comparison with a normal state (FIG. 2) in which there is neither a cell loss nor a cell insertion.

The information fields in FIGS. 2 through 4 have a length of $2^N$ equals 8 bits, wherein $N=3$ and the test signal sequence has a period $2^{N-1}=7$ bits as can be generated in a feedback shift register with $N=3$ stages.

In FIG. 2 one can see sequential information fields A though F traversing the respective channel of a transmission module with a continuous periodic sequence (bit 1 to bit 7) of test signal bits. The lower diagram of FIG. 2 shows similarly the reference signal sequences of test bits (bit number 1 to bit number 7) as resulting from the enabling function of the evaluating unit 3.

The shift registers 4 and 6 thus register the successive segments from the two diagrams of FIG. 2 whose lengths are determined by the number of stages of the to shift registers as a consequence the corresponding stages of the two shift registers will normally have equal numbers of bits so that the bit comparator 13 will signal at its output "no bit error".

In the event of a bit error, of course, the output at bit comparator 13 will change.

FIG. 3 shows a diagram similar to FIG. 2 in which there has been loss of the information field B, i.e. a cell loss. In that case, the reference signal b will then be juxtaposed with the information field C of the received test signal and which will lead the reference signal field b by one bit. There appears, as a consequence, only at the output of the bit comparator 7 a constant or continuous signal which indicates the loss of one cell. At all other bit comparators 8 through 13 the bit sequences which are compared are shifted by one or more bits so that they continuously output varying or alternating signals.

FIG. 4 shows the diagram similar to FIG. 2 in which, however, there has been a cell insertion. This cell insertion has taken place between the information fields A and B and is represented by the inserted field X of a respective cell. This insertion can have resulted from another logic transmission channel and can have falsely been inserted in the sequences transmitted through the particular test channel.

In the reference signal field b, beginning with bit number 2 and continuing for the remainder of the bit sequence, there is no correspondence with the information field X. A correspondence is found only with the bits of information field B and the bit sequence in reference field c lags by one bit. As a consequence, a constant signal appears only at the output of the bit comparator 10 and this continuous output signals the insertion of a cell. At all other bit comparators 7 through 9 and 11 through 13 the bit sequences which are compared have one or more cells shifted with respect to one another so that they continuously output alternating signals.

I claim:

1. A method of ascertaining a cell loss and/or a cell insertion in a cell-structured signal, whose cells each are comprised of a header field containing switching information and a message-containing information field, traversing a selected logical channel of a cell-oriented transmission module having a transmission side and an output receiving side, said method comprising the steps of:
   (a) generating at said transmission side a cell-structured test signal having respective cells each comprised of a respective header field having a first number of bits and a respective information field having a second number of bits and bit lengths corresponding to a standard of said transmission module, and wherein
      (a₁) said header fields of the cells associated with given logical channels of said transmission module include characterizing indicia assigned to the respective logical channels, and
      (a₂) the information fields of the cells associated with given logical channels of said transmission module include a periodic test-signal sequence whose periods are smaller by one bit than the second number of bits of the respective information field;
   (b) recognizing at said output side the header fields of the cells assigned to the logical test channel arriving at said output side;
   (c) arraying the information fields of the cells recognized at said output side into respective linear bit sequences;
   (d) generating at said output side a reference-signal sequence corresponding to the test-signal sequence generated at said transmission side and starting the generation of said reference-signal sequence at the end of recognition of a respective header field of a respective cell and stopping the generation of said reference-signal sequence upon the generation of a number of bits corresponding to said second number; and
   (e) comparing each of said linear bit sequences bitwise with the reference-signal sequence whereby:
      (e₁) a first comparison wherein one of the compared sequences leads the other compared sequence by one bit and a second comparison wherein one of the compared sequences lags the other compared sequence by one bit, and
      (e₂) a continuous agreement of the bit values obtained by the bitwise comparison confirms the loss or insertion of cells.

2. The method defined in claim 1 wherein further comparisons in which said one of said bit sequences leads or lags the other of said bit sequences by n bits where n is an integer greater than one (n=2, 3, ...) and a continuous agreement of the bit values obtained by the bitwise comparison confirm a loss or insertion of n cells.

3. The method defined in claim 1 wherein said periodic test-signal sequence is a pseudorandom signal generated in a feedback shift register.

4. The method defined in claim 1 wherein the ascertaining of a cell loss or cell insertion is carried out simultaneously with a distinguishing of bundle errors from a failure of synchronization between said transmission side and said receiving side by a bit-error measuring device and wherein:
   two pseudorandom signal sequences are generated in respective feedback shift registers in a transmitter and a receiver of the bit-error measuring device;
   a bit-wise comparison is effected between a signal sequence transmitted over a link under test and the pseudorandom signal sequence of the receiver of the bit-error measuring device;
   an error-signal sequence is produced by the bit-wise comparison effected between the signal sequence transmitted over the link under test end the pseudorandom signal sequence of the receiver of the bit-error measuring device, and
   the error-signal sequence is evaluated to indicate selectively and distinguish a synchronization failure and bundle errors.

5. The method defined in claim 4 wherein, after detection of a synchronization failure, a new synchronization is automatically started.

6. The method defined in claim 4 wherein further comparisons in which said one of said bit sequences leads or lags the other of said bit sequences by n bits where n is an integer greater than one (n=2, 3, ...) and a continuous agreement of the bit values obtained by the, bitwise comparison confirm a loss or insertion of n cells.

7. The method defined in claim 6 wherein, after detection of a synchronization failure, a new synchronization is automatically started.

8. A circuit for ascertaining a cell loss and/or a cell insertion in a cell-structured signal, whose cells each are comprised of a header field containing switching information and a message-containing information field, traversing a selected logical channel of a cell-oriented transmission module having a transmission side and an output receiving side, said circuit comprising:
   (a) means for generating at said transmission side a cell-structured test signal having respective cells each comprised of a respective header field having a first number of bits and a respective information field having a second number of bits and bit lengths corresponding to a standard of said transmission module, and wherein
- (a₁) said header fields of the cells associated with given logical channels of said transmission module include characterizing indicia assigned to the respective logical channels, and
- (a₂) the information fields of the cells associated with given logic channels of said transmission module include a periodic test-signal sequence whose periods are smaller by one bit than the second number of bits of the respective information field;
- (b) means for recognizing at said output side the header fields of the cells assigned to the logical test channel arriving at said output side;
- (c) means for arraying the information fields of the cells recognized at said output side into respective linear bit sequences;
- (d) means for generating at said output side a reference-signal sequence corresponding to the test-signal sequence generated at said transmission side and starting the generation of said reference-signal sequence at the end of recognition of a respective header field of a respective cell and stopping the generation of said reference-signal sequence upon the generation of a number of bits corresponding to said second number; and
- (e) means for comparing each of said linear bit sequences bitwise with the reference-signal sequence whereby:
  - (e₁) a first comparison wherein one of the compared sequences leads the other compared sequence by one bit and a second comparison wherein one of the compared sequences lags the other compared sequence by one bit, and
  - (e₂) a continuous agreement of the bit values obtained by the bitwise comparison confirms the loss or insertion of cells.

9. The circuit defined in claim 8 wherein
said means for recognizing the header fields and the means for arraying the information fields include:
a unit (3) for distinguishing each header field from a respective information field of a cell transmitted along a respective logic channel and separating the respective header field from the respective information field, and
a first shift register (4) connected to said unit (3) into which the separated information field is fed;
said means for generating includes:
  a reference-signal generator (5) connected to said unit (3) and to said first shift register (4) for generating a reference signal constituting said test-signal sequence and whose period is shorter by one bit than the second number of bits of the information field stored in said shift register (4), and
  a second shift register (6) connected to said reference-signal generator (5) and in which said reference signal is stored synchronously with storage of a respective information field in said first shift register; and
said means for comparing includes two bit comparators (7, 10) each connected to a stage of said first shift register (4) and said second shift register (6) with said bit comparators being connected to said stages so that they are offset by one stage with respect to one another in a first and a second direction, respectively.

10. The circuit defined in claim 9, further comprising another bit comparator having inputs connected to two parallel stages of said shift registers (4 and 6).

11. The circuit defined in claim 9 which comprises a first group of bit comparators (7 to 9) having first inputs connected with the last stage of said second shift register (6) and second inputs successively connected with stages of the first shift register (4) shifted by one bit from the stage of the second shift register (6) to which said first inputs are connected and each in succession by one bit from another, and a second group of bit comparators (10 to 12) each having first inputs connected with the last stage of said first shift register (4) and second inputs successively connected with stages of the second shift register (6) shifted by one bit from the stage of the second shift register (4) to which said first inputs of said second group are connected and each in succession by one bit from another.

12. The circuit defined in claim 11, further comprising another bit comparator having inputs connected to two parallel stages of said shift registers (4 and 6).

* * * * *